United States Patent

Lucht et al.

[11] Patent Number: 5,955,044
[45] Date of Patent: Sep. 21, 1999

[54] METHOD AND APPARATUS FOR MAKING ULTRA-PURE HYDROGEN

[75] Inventors: Jeffrey Lucht, Avondale; Thomas Hsiao-Ling Hsiung, Emmaus, both of Pa.

[73] Assignees: Johnson Matthey Inc., Wayne; Air Products and Chemicals Inc., Allentown, both of Pa.

[21] Appl. No.: 08/941,530

[22] Filed: Sep. 30, 1997

[51] Int. Cl.$^6$ .............................. B01D 53/22; C01B 3/02
[52] U.S. Cl. ................... 423/230; 95/55; 95/56; 96/4; 96/11; 422/177; 423/246; 423/648.1
[58] Field of Search ............ 95/55, 56, 648.1, 95/650; 423/652, 246, 220, 230; 422/177; 96/4, 11

[56] References Cited

U.S. PATENT DOCUMENTS

| | | |
|---|---|---|
| 2,747,970 | 5/1956 | Rosenblatt . |
| 2,773,561 | 12/1956 | Hunter . |
| 3,251,652 | 5/1966 | Pfefferle . |
| 3,615,164 | 10/1971 | Baker et al. . |
| 3,663,162 | 5/1972 | Randhava . |
| 4,056,373 | 11/1977 | Rubin . |
| 4,238,204 | 12/1980 | Perry ................................ 95/56 |
| 4,242,105 | 12/1980 | Frost . |
| 4,368,142 | 1/1983 | Frohning et al. . |
| 4,400,575 | 8/1983 | Frost . |
| 4,654,047 | 3/1987 | Hopkins et al. . |
| 4,732,583 | 5/1990 | DeLong et al. . |
| 5,064,446 | 11/1991 | Kusuki et al. ............... 95/55 |
| 5,259,870 | 11/1993 | Edlund ....................... 95/56 |
| 5,489,327 | 2/1996 | Otsuka et al. . |
| 5,492,682 | 2/1996 | Succi et al. . |
| 5,556,603 | 9/1996 | Succi et al. . |

FOREIGN PATENT DOCUMENTS

0434562 B1  8/1995  European Pat. Off. .

*Primary Examiner*—Wayne Langel
*Attorney, Agent, or Firm*—Ratner & Prestia

[57] ABSTRACT

Ultra-high purity hydrogen is produced from a hydrogen stream containing impurities including carbon monoxide and carbon dioxide, by first depleting the stream of carbon monoxide and carbon dioxide, than passing it through a semipermeable membrane such as a palladium-silver membrane, to remove methane, water and other impurities. Preferably, a methanation catalyst is used in the first step to convert the carbon monoxide and carbon dioxide to methane and water. This stream, free of carbon monoxide and carbon dioxide, is then passed through the semipermeable membrane to separate the remaining impurities.

16 Claims, 1 Drawing Sheet

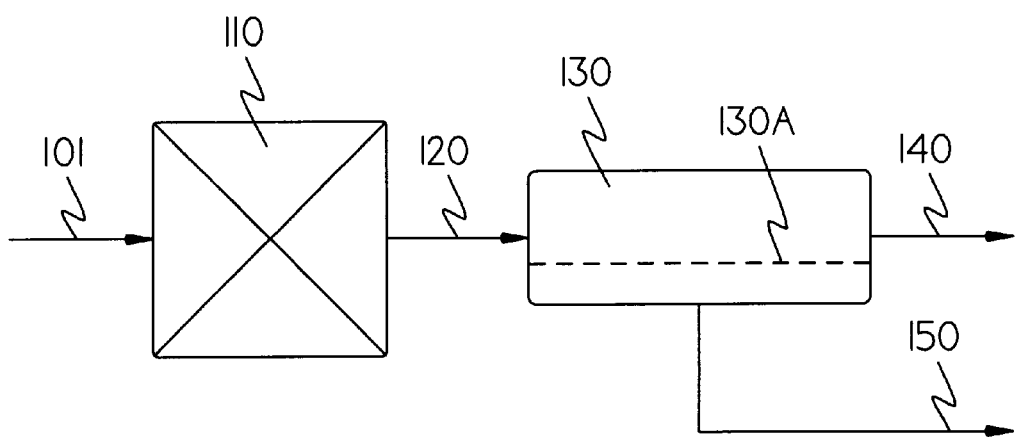

METHOD AND APPARATUS FOR MAKING ULTRA-PURE HYDROGEN

FIELD OF THE INVENTION

This invention relates generally to a process for the purification of hydrogen gas, and more specifically to an improved process and apparatus for making ultra-pure hydrogen by a modified membrane separation technique.

BACKGROUND OF THE INVENTION

Hydrogen is used in a variety of industrial processes. Because of this demand for hydrogen and particularly for hydrogen free of impurities, an equally wide variety of techniques have been developed for separating impurities from hydrogen.

An impetus for continued improvement of hydrogen purification to levels of ultra-high purity stems from development in the manufacture of integrated circuits where ever increasing line densities require high purity processing materials. Because hydrogen is a key component in many of these semiconductor manufacturing processes, ultra-high purity hydrogen is of particular importance in this field. Commercially available hydrogen typically contains impurities, including: carbon monoxide, carbon dioxide, oxygen, nitrogen, water, and methane, among others. These components must be separated from the hydrogen to achieve appropriate levels of purity for many industrial applications.

One method for purifying hydrogen, as described in U.S. Pat. No. 5,492,682, involves a two-step process. The first step of the two part process involves the removal of carbon monoxide by contacting the stream containing carbon monoxide with a nickel catalyst to form nickel-carbonyl. This carbon monoxide-free stream is then passed through a second reaction zone wherein it is contacted with a titanium nickel catalyst in order to further purify the stream by removing methane and carbon dioxide.

Another purification method, as described in U.S. Pat. No. 4,056,373, involves the use of a selectively permeable noble-metal membrane. In this method, a membrane is selected such that only hydrogen will pass through. An example is the use of a palladium-alloy filter coil. There, the purification filter separates hydrogen from the impurities present in the hydrogen stream by limiting passage to hydrogen.

Another purification method, as described in U.S. Pat. No. 4,654,047, uses a two-step membrane/cryogenic process. The process involves a first step of separating a stream of gases into a hydrogen-rich component and a hydrogen-lean component by selective permeation through a cellulose acetate, polysulfone, or polyimide type membrane or hollow filter. The hydrogen-lean stream is subsequently treated by a cryogenic process to remove some of the remaining impurities to produce a more enriched hydrogen stream.

Still another technique for the purification of hydrogen, as described in U.S. Pat. No. 3,251,652, begins with a stream comprised of hydrogen and hydrocarbons. This stream is contacted with steam and air to convert the hydrocarbons to carbon monoxide. That stream is then treated with a gaseous diffusion process (utilizing a palladium-silver alloy membrane) to separate the hydrogen from the carbon monoxide. The stream from that process containing mostly carbon monoxide (and some hydrogen) is then contacted with steam to produce carbon dioxide and hydrogen through a shift reaction. This mixture is then passed through a second palladium-silver alloy membrane to separate the hydrogen and carbon dioxide.

Notwithstanding these various processes, there remains a need for an improved method for producing ultra-pure hydrogen, adequate for modern semiconductor manufacturing.

SUMMARY OF THE INVENTION

The present invention provides a novel process and apparatus for producing ultra-pure hydrogen from a hydrogen stream containing impurities such as carbon monoxide, carbon dioxide, methane, water, and nitrogen, and particularly to such a stream including carbon monoxide and/or carbon dioxide. The process comprises a first step of depleting the hydrogen stream of carbon monoxide and carbon dioxide and then separating the remaining impurities from the hydrogen stream by passing the stream through a selectively permeable membrane. Preferably, the first step of the two part process involves a methanation catalyst wherein the carbon monoxide and carbon dioxide, present as impurities, are reacted to form methane and water. The carbon monoxide-free and carbon dioxide-free stream is then passed through a selectively permeable membrane, preferably a palladium-based membrane and most preferably a palladium-silver alloy membrane, to filter out the methane, water, and nitrogen, thus producing an ultra-high purity hydrogen product stream.

BRIEF DESCRIPTION OF THE DRAWING

The FIGURE is a schematic view of the process and apparatus of the present invention.

DETAILED DESCRIPTION OF THE INVENTION

The present invention provides an efficient and effective process and apparatus for recovering a hydrogen-rich stream from a stream of hydrogen containing impurities, particularly, carbon monoxide, carbon dioxide, methane, water, and nitrogen. The first step is to deplete the stream of carbon monoxide and carbon dioxide, preferably by converting those impurities into methane and water. The subsequent stream, free of carbon monoxide and carbon dioxide, is then passed through a selectively permeable membrane to separate the remaining impurities, namely water, nitrogen, and methane, from the hydrogen. The result is an ultra-pure hydrogen stream.

In FIGURE, there is shown a schematic view of the apparatus and process of this invention in which a feed stream 101, containing hydrogen and impurities, including CO and $CO_2$, possibly also including one or more of nitrogen ($N_2$), methane ($CH_4$), and water ($H_2O$), is fed into methanation unit 110, in which is located a methanation catalyst (not shown) such as a static packed bed of ruthenium on alumina spheres. Other catalysts could be used, however, including a monolithic type, wherein the active catalyst agent is coated onto a honeycomb structure. Additionally, various materials could be used as the active catalyst agent, including nickel. In the methanation unit 110, the carbon monoxide (CO) and carbon dioxide ($CO_2$) are reacted with hydrogen ($H_2$) to form methane ($CH_4$) and water ($H_2O$). The stream exiting the methanation catalyst 110, intermediate stream 120, contains hydrogen ($H_2$), along with some methane ($CH_4$), water ($H_2O$), and nitrogen ($N_2$). This intermediate stream 120 is then passed across a palladium or palladium alloy membrane 130A in palladium membrane unit 130. A common membrane material is a palladium-silver alloy. Other membrane structures and materials are discussed below. Inside the hydrogen membrane unit 130 is allowed to permeate the palladium membrane 130A and exit palladium membrane unit 130 as ultra-pure hydrogen product stream 150. The separated impurities exit palladium membrane unit 130 as bleed gas stream 140, typically containing methane ($CH_4$), water ($H_2O$), nitrogen ($N_2$), and some hydrogen ($H_2$).

In a process and apparatus of the type illustrated in the FIGURE, hydrogen with less than 3 parts-per-billion (ppb) methane can be achieved from an impure hydrogen stream containing tens of parts-per-million (ppm) levels of carbon monoxide and carbon dioxide.

The inventors believe that when carbon monoxide and carbon dioxide are not removed from the stream prior to contact with the selectively permeable membrane, but are allowed to reach the membrane, the carbon monoxide and carbon dioxide dissociate into their constituents (carbon and oxygen) on the surface of that membrane, and some of the carbon atoms pass through the membrane. Once on the other side, those carbon atoms react with the hydrogen to form methane, and the desired purity of hydrogen is therefore not achieved. Especially in the case of semiconductor manufacturing, even trace amounts of methane (on the ppb level) can be detrimental.

Data collected in several experiments combine to support the above theory. Table 1 is a summary of experiments which demonstrate the effectiveness of the present invention.

stream, and the level continued to climb well above the acceptable 10 ppb level.

In experiment number 4, the same conditions were used as in experiment number 1, except that a methanation unit (as illustrated in the FIGURE) was installed upstream of the PdAg alloy membrane. High purity hydrogen was produced with each tested impurity present at levels lower than 10 ppb, and this ultra-pure product was produced for up to four hours.

The inventors believe that the decreased methane ($CH_4$) presence in the final product stream of experiment 4 was due to the fact that the CO and $CO_2$ present in the feed stream were reacted with hydrogen to form $CH_4$ and $H_2O$ in the methanation catalyst. In experiment 3, however, the inventors believe that the $CO_2$ dissociated into carbon and oxygen on the surface of the Pd-membrane and some of that carbon (C) passed through the membrane and reacted with hydrogen on the other side to form $CH_4$. This hypothesis is further supported by experiment 2, where the $CH_4$ content in the product stream remained constant and low where no CO or $CO_2$ was present in the feed stream. Thus, in experiment 2, there was no free carbon (C) available to pass through the membrane and form $CH_4$ on the pure side. The inventors further believe that $CH_4$ does not dissociate on the surface of palladium as does the CO and $CO_2$. Such a belief is supported by the empirical data obtained and discussed above.

An apparatus utilizing this method may comprise, for example, a first vessel wherein the feed stream is allowed to

TABLE I

| Experiment # | Hydrogen Feed Stream Composition (Impurities, ppm) | | Methanation Catalyst Upstream? | Methane ($CH_4$) Level in Product Stream |
|---|---|---|---|---|
| 1 | 20 | CO | No | 50 ppb |
|  | 20 | $CO_2$ |  | (at 40 minutes) |
|  | 20 | $CH_4$ |  |  |
|  | 400 | $N_2$ |  |  |
| 2 | 25 | $CH_4$ | No | <10 ppb |
|  |  |  |  | (up to about 4 hours) |
| 3 | 25 | $CO_2$ | No | >10 ppb |
|  |  |  |  | (within 10 minutes) |
| 4 | 20 | $CO_2$ | Yes | <10 ppb |
|  | 20 | $CH_4$ |  |  |
|  | 400 | $N_2$ |  |  |

In experiment number 1, a high purity hydrogen stream with other impurities below 10 ppb was contaminated with 20 ppm CO, 20 ppm $CO_2$, 20 ppm $CH_4$, and 400 ppm $N_2$ to simulate a typical industrial gas hydrogen supply. Such a simulated hydrogen stream was then passed through a palladium (Pd) silver (Ag) alloy membrane hydrogen purifier operated at 375° C. The product hydrogen was monitored using a highly sensitive Atmospheric Pressure Ionization Mass Spectrometer (APIMS). Within 40 minutes after the introduction of the contaminated stream, the methane in the product increased to about 50 ppb.

In experiment number 2, conditions were maintained similar to experiment number 1, with one exception. In this second experiment, the high purity hydrogen stream was contaminated only with 25 ppm methane ($CH_4$). This time, the methane ($CH_4$) level in the product remained below 10 ppb for four (4) hours.

In experiment number 3, again otherwise similar to experiment number 1, the high purity hydrogen stream was contaminated only with 25 ppm carbon dioxide ($CO_2$). The methane ($CH_4$) level in the product stream increased within 10 minutes after the introduction of the contaminated contact the catalyst under conditions determined to be adequate for desired conversion of the carbon monoxide and carbon dioxide into methane and water. Such a device could be, for example, a packed bed or a monolithic type catalyst reactor. A monolithic type catalyst reactor is a reactor wherein the active catalyst agent is coated onto a honeycomb structure and the reactants are allowed to contact the surface of the honeycomb.

An apparatus utilizing this invention would also comprise a second vessel—a membrane device. The membrane material could be of several types, including, as discussed above, a palladium based alloy. A palladium based alloy is one constructed of predominately palladium, and also some other noble-metal, such as gold, silver, mercury, platinum, iridium, rhodium, ruthenium, and osmium. A palladium based membrane is a membrane constructed of a palladium based alloy. Additional elements could also be utilized as membrane material, including a tungsten/tantalum combination. The membrane device itself could be a tube type, wherein tubes constructed of the membrane material are coiled within a vessel, and the stream is passed through the coils such that the components which can pass through the membrane pass through and enter into the area within the vessel outside of the coiled tube. Additionally, several tubes may be placed within a single vessel. Alternatively, the membrane could be constructed as a plate or foil, through which the stream is passed. The membrane could also be a micron-thin, thin-film coating on a ceramic substrate, the coating comprising Pd or some other effective membrane material.

Although this invention has been described with reference to specific examples thereof, it is understood that variations of the invention as described and exemplified may be made by those skilled in the art without departing from the true spirit of the invention. It is intended that the appended claims be construed to include all such variations.

What is claimed:

1. A process for obtaining ultra-pure hydrogen from a hydrogen stream containing one or both of carbon monoxide and carbon dioxide, comprising:

first, depleting said hydrogen stream of carbon monoxide and carbon dioxide, and second, separating remaining impurities from said hydrogen stream by passing said stream through a selectively permeable palladium or palladium alloy membrane.

2. A process according to claim 1 wherein said hydrogen stream contains impurities including one or both of carbon monoxide and carbon dioxide, and none, one, or both of nitrogen and water.

3. A process according to claim 1 wherein said first step comprises contacting said stream with a methanation catalyst.

4. A process according to claim 3 wherein said methanation catalyst is comprised of ruthenium.

5. A process according to claim 1 wherein said selectively permeable membrane is a palladium alloy membrane.

6. A process according to claim 1 wherein said selectively permeable membrane is a palladium-silver alloy membrane.

7. A process according to claim 1, wherein said selectively permeable membrane is a thin film coating wherein said coating is supported on a ceramic substrate.

8. A process according to claim 1 wherein said second step comprises passing said stream through a palladium-based hydrogen purifier operated within a temperature range of about 300° C. and 400° C.

9. The process of claim 1 wherein the remaining methane content of said hydrogen stream following passage through said membrane is less than 10 parts per billion volume.

10. The process of claim 5 wherein said membrane is comprised of a palladium alloy comprising palladium and a metal selected from the group consisting of gold, silver, mercury, platinum, iridium, rhodium, ruthenium, and osmium.

11. The process of claim 1 wherein said membrane further comprises tantalum and tungsten.

12. An apparatus for obtaining ultra-pure hydrogen from a gas mixture comprised of hydrogen and also one or both of carbon monoxide and carbon dioxide, and other impurities, said apparatus comprising:

means for removing one or both of said carbon monoxide and carbon dioxide from said gas mixture and producing an intermediate stream free thereof;

a selectively permeable palladium or palladium alloy membrane adapted to separate impurities other than carbon monoxide and carbon dioxide from said intermediate stream; and means for passing said intermediate stream through said metallic membrane.

13. An apparatus according to claim 12 wherein said removing means contains a methanation catalyst in contact with said gas mixture.

14. An apparatus according to claim 12 wherein said membrane is a palladium alloy membrane.

15. The apparatus of claim 12 wherein said membrane is comprised of a palladium alloy comprising palladium and a metal selected from the group consisting of gold, silver, mercury, platinum, iridium, rhodium, ruthenium, and osmium.

16. The apparatus of claim 12 wherein said membrane further comprises tantalum and tungsten.

* * * * *